United States Patent
Anderson et al.

(10) Patent No.: US 8,812,447 B1
(45) Date of Patent: Aug. 19, 2014

(54) COMPUTER IMPLEMENTED SYSTEM FOR ACCELERATING ELECTRONIC FILE MIGRATION FROM MULTIPLE SOURCES TO MULTIPLE DESTINATIONS

(71) Applicant: Access Sciences Corporation, Houston, TX (US)

(72) Inventors: Janice Carver Anderson, Houston, TX (US); Renu Susan Babu Hall, Houston, TX (US); Alex Daniel Williams, Houston, TX (US); John Ambrose Harold, Houston, TX (US); Anne Genevieve Tulek, Houston, TX (US)

(73) Assignee: Access Sciences Corporation, Houston, TX (US)

( * ) Notice: Subject to any disclaimer, the term of this patent is extended or adjusted under 35 U.S.C. 154(b) by 0 days.

(21) Appl. No.: 13/663,091

(22) Filed: Oct. 29, 2012

Related U.S. Application Data

(60) Provisional application No. 61/557,552, filed on Nov. 9, 2011.

(51) Int. Cl.
*G06F 17/30* (2006.01)

(52) U.S. Cl.
CPC .... *G06F 17/30126* (2013.01); *G06F 17/30079* (2013.01); *G06F 17/30221* (2013.01)
USPC ........... 707/654; 707/204; 707/610; 707/634

(58) Field of Classification Search
CPC .................... G06F 17/30126; G06F 17/30221; G06F 17/30079
See application file for complete search history.

(56) References Cited

U.S. PATENT DOCUMENTS

| | | | |
|---|---|---|---|
| 6,370,646 B1 * | 4/2002 | Goodman et al. | 713/100 |
| 7,225,247 B2 | 5/2007 | Kennedy et al. | |
| 7,478,096 B2 | 1/2009 | Margolus et al. | |
| 7,502,891 B2 | 3/2009 | Shachor | |
| 7,512,636 B2 | 3/2009 | Verma et al. | |
| 7,792,945 B2 | 9/2010 | Paknad et al. | |
| 8,156,281 B1 * | 4/2012 | Grosner et al. | 711/114 |
| 2003/0110237 A1 * | 6/2003 | Kitamura et al. | 709/219 |
| 2005/0125463 A1 * | 6/2005 | Joshi et al. | 707/204 |
| 2006/0212671 A1 * | 9/2006 | Todd | 711/165 |
| 2007/0022129 A1 * | 1/2007 | Bahar et al. | 707/100 |
| 2007/0055715 A1 * | 3/2007 | Achiwa | 707/204 |
| 2007/0130423 A1 * | 6/2007 | Liu et al. | 711/114 |
| 2008/0104145 A1 * | 5/2008 | Lipman et al. | 707/204 |
| 2008/0235300 A1 * | 9/2008 | Nemoto et al. | 707/204 |

(Continued)

OTHER PUBLICATIONS

Hurley, Richard T., and Soon Aun Yeap. "File migration and file replication: a symbiotic relationship." Parallel and Distributed Systems, IEEE Transactions on 7, No. 6 (1996): 578-586.*

*Primary Examiner* — Neveen Abel Jalil
*Assistant Examiner* — Kristofer Biskeborn
(74) *Attorney, Agent, or Firm* — Buskop Law Group, PC; Wendy Buskop

(57) ABSTRACT

A system for migrating electronic files from a plurality of sources, for ECM systems, file shares or others, for use on a client device or on an administrative server, which can be in a cloud computing system, from at plurality of source repositories to a plurality of destination repositories quickly, accurately, and in an accelerated manner using a migration simulation in embodiments. The system includes a processor in communication with data storage and a client device via a network or a computing cloud or both.

21 Claims, 17 Drawing Sheets

(56) References Cited

U.S. PATENT DOCUMENTS

| | | | |
|---|---|---|---|
| 2009/0228531 A1* | 9/2009 | Baumann et al. | 707/204 |
| 2009/0271455 A1* | 10/2009 | Nagarajan et al. | 707/204 |
| 2011/0213814 A1* | 9/2011 | Fukatani et al. | 707/827 |
| 2011/0276821 A1* | 11/2011 | Gudlavenkatasiva et al. | 714/3 |

* cited by examiner

FIGURE 2A

| | |
|---|---|
| DYNAMIC RULES GENERATION LIBRARY | 26 |
| EDITABLE CLASSIFICATION RULES | 28 |
| CLASSIFICATION COMPARISON RULES | 30 |
| CLASSIFICATION OPERATION RULES | 32 |
| CLASSIFICATION RULE VALUES | 34 |
| CLASSIFICATION TITLE | 36 |
| CLASSIFICATION RULE DESCRIPTIONS | 38 |
| CLASSIFICATION RULE ENTRIES | 29 |
| EDITABLE EXCLUSION RULES | 50 |
| EXCLUSION COMPARISON RULES | 52 |
| EXCLUSION OPERATION RULES | 54 |
| EXCLUSION RULE VALUES | 56 |
| EXCLUSION VALUE TITLES | 58 |
| EXCLUSION RULE DESCRIPTIONS | 60 |
| EXCLUSION RULE ENTRIES | 51 |
| OUTPUT SETTINGS | 76 |
| OUTPUT SYSTEM TYPE | 78 |
| OUTPUT SYSTEM ENVIRONMENT | 80 |
| OUTPUT SYSTEM DATA DESTINATION ROOT PATH | 82 |
| INCLUDE OUTPUT SUBFOLDERS INDICATOR | 84 |
| INDICATOR PROMPT TO RENAME MANUALLY | 86 |
| INDICATOR TO AUTO-REMOVE INVALID CHARACTERS | 88 |
| INPUT SETTINGS | 91 |
| INPUT SYSTEM TYPE | 93 |
| INPUT DATA SOURCE ENVIRONMENT | 95 |
| INPUT DATA SOURCE ENVIRONMENT ROOT PATH | 97 |
| INCLUDE INPUT DATA SUBFOLDERS INDICATOR | 99 |

FIGURE 3B

| | |
|---|---|
| COMPUTER INSTRUCTIONS TO DELETE MIGRATION PROFILE ENTRIES IN THE MIGRATION MANAGEMENT CONSOLE | 422 |
| COMPUTER INSTRUCTIONS TO VIEW THE MIGRATION PROFILE ENTRY, EDIT THE MIGRATION PROFILE ENTRY, OR COMBINATIONS THEREOF | 424 |
| COMPUTER INSTRUCTIONS TO CONFIGURE THE PROCESSOR TO DISPLAY AUDIT LOGS, WHEREIN THE AUDIT LOGS COMPRISE INFORMATION RELATING TO CHANGES MADE BY THE USER TO THE MIGRATION PROFILE | 408 |
| COMPUTER INSTRUCTIONS TO CREATE A NEW MIGRATION PROFILE | 426 |
| COMPUTER INSTRUCTIONS TO VERIFY THAT THE SIMULATED MIGRATION OF THE FILE INVENTORY WAS COMPLETED FROM THE SOURCE REPOSITORY TO THE DESTINATION REPOSITORY WITH FEWER THAN A PRESET NUMBER OF CLIENT ALLOWABLE ERRORS | 434 |
| COMPUTER INSTRUCTIONS TO REVISE THE MIGRATION PROFILE CHANGING CONFIG SETTINGS WHEN THE SIMULATED MIGRATION IS COMPLETED WITH ERRORS GREATER THAN THE PRESET NUMBER OF CLIENT ALLOWABLE ERRORS | 435 |
| COMPUTER INSTRUCTIONS TO MIGRATE THE SOURCE MATERIAL AFTER SIMULATION WITH FEWER THAN THE PRESET NUMBER OF CLIENT ALLOWABLE ERRORS HAS OCCURED | 436 |
| COMPUTER INSTRUCTIONS TO SAVE AND CLOSE THE ACTUAL MIGRATION, THE MIGRATION SIMULATION, OR COMBINATIONS THEREOF, AT ANY POINT OF THE MIGRATION | 438 |
| COMPUTER INSTRUCTIONS TO BROWSE THE SOURCE FOLDER PATHS | 442 |
| COMPUTER INSTRUCTIONS TO EDIT/VIEW A CLASSIFICATION LIST | 446 |
| COMPUTER INSTRUCTIONS TO SAVE AND CLOSE THE EDITABLE CLASSIFICATION RULES | 448 |
| COMPUTER INSTRUCTIONS TO PROVIDE AN EDIT AND VIEW EDITED CLASSIFICATION RULES DISPLAYING THE CLASSIFICATION TITLE AND CLASSIFICATION RULE DESCRIPTIONS OF THE MIGRATION PROFILE | 450 |
| COMPUTER INSTRUCTIONS TO CREATE EXCLUSION RULES | 452 |
| COMPUTER INSTRUCTIONS TO CREATE CLASSIFICATION RULES | 454 |
| COMPUTER INSTRUCTIONS TO EXTRACT INFORMATION FROM THE PROGRESS LOG INTO A SEPARATE FILE FORM | 456 |
| COMPUTER INSTRUCTIONS TO SAVE AND CLOSE THE MIGRATION PROFILE AT ANY POINT DURING USE | 458 |
| COMPUTER INSTRUCTIONS TO SAVE AND CLOSE THE MIGRATION MANAGEMENT CONSOLE AT ANY POINT DURING USE | 460 |
| COMPUTER INSTRUCTIONS TO DELETE AN EXCLUSION RULE ENTRY | 462 |
| COMPUTER INSTRUCTIONS TO EDIT OR ADD TO AN EXCLUSION RULE ENTRY | 464 |
| COMPUTER INSTRUCTIONS TO SAVE AND CLOSE EDITABLE EXCLUSION RULES AT ANY TIME DURING USE | 466 |

| | |
|---|---|
| COMPUTER INSTRUCTIONS TO DELETE A CLASSIFICATION RULE ENTRY | 468 |
| COMPUTER INSTRUCTIONS TO EDIT OR ADD TO A CLASSIFICATION RULE ENTRY | 470 |
| COMPUTER INSTRUCTIONS TO CONFIGURE THE PROCESSOR FOR SELECTING AND INSERTING A REFERENCE INTO THE METADATA FIELD | 472 |
| COMPUTER INSTRUCTIONS TO ADD SOURCE/DESTINATION MAP RULE ENTRIES | 476 |
| COMPUTER INSTRUCTIONS TO VIEW/EDIT SOURCE/DESTINATION MAP RULE ENTRIES | 478 |
| COMPUTER INSTRUCTIONS TO DELETE SOURCE/DESTINATION MAP RULE ENTRIES | 480 |
| COMPUTER INSTRUCTIONS TO IDENTIFY REFERENCES TO BE INSERTED INTO SOURCE MATERIAL PRIOR TO MIGRATION | 481 |
| COMPUTER INSTRUCTIONS TO BROWSE THE SOURCE REFERENCE FILE PATHS | 482 |
| COMPUTER INSTRUCTIONS TO BROWSE ROOT MAPS IN THE ADMINISTRATIVE DATA STORAGE BETWEEN A SOURCE REPOSITORY AND A DESTINATION REPOSITORY | 484 |
| COMPUTER INSTRUCTIONS TO CONFIGURE THE PROCESSOR TO BROWSE REFERENCES INSERTED INTO THE ROOT MAPS | 486 |
| COMPUTER INSTRUCTIONS TO APPLY ADDITIONAL DESTINATION RULES TO FILE INVENTORY | 488 |
| COMPUTER INSTRUCTIONS TO DELETE A METADATA RULE ENTRY | 522 |
| COMPUTER INSTRUCTIONS TO DELETE AN ENTRY FROM THE CLASSIFICATION LIST | 524 |
| COMPUTER INSTRUCTIONS TO ADD A CLASSIFICATION LIST ITEM | 526 |
| COMPUTER INSTRUCTIONS TO SAVE AND CLOSE THE CLASSIFICATION LIST | 528 |
| COMPUTER INSTRUCTIONS TO PROVIDE A THIS FOLDER INDICATOR AND A TOTAL FOLDERS INDICATOR | 536 |

*FIGURE 3C*

EDITABLE CLASSIFICATION RULES

PROFILE NAME: OIL AND GAS CO.

| *COMPARISON RULE | *OPERATION RULE | *CLASSIFICATION RULE VALUE | *CLASSIFICATION TITLE | *CLASSIFICATION RULE DESCRIPTION | | |
|---|---|---|---|---|---|---|
| PARENT FOLDER PATH ▶ | CONTAINS ▶ | HOUSTON BMU | WELL DRILLING DATA ▶ | HOUSTON BMU FOLDER IS... | DELETE | ADD/EDIT |
| PARENT FOLDER PATH ▶ | ENDS WITH ▶ | OSHA | HEALTH AND SAFETY ▶ | OSHA FOLDER IS HEALTH... | DELETE | ADD/EDIT |
| PARENT FOLDER ▶ | IS EQUAL TO/MATCHES ▶ | SAFETY | WELL DRILLING DATA ▶ | ALL SAFETY FILES GO TO... | DELETE | ADD/EDIT |
| FILE NAME ▶ | CONTAINS ▶ | SURVEY | HEALTH AND SAFETY ▶ | ALL SURVEYS ARE DRILLING... | DELETE | ADD/EDIT |
| FILE NAME ▶ | CONTAINS ▶ | SAFETY | HEALTH AND SAFETY ▶ | FILES LABELED SAFETY ARE... | DELETE | ADD/EDIT |
| FILE EXTENSION ▶ | IS EQUAL TO/MATCHES ▶ | PPT | WELL KEY FACTS ▶ | WELL SITE PRESENTATIONS... | DELETE | ADD/EDIT |
| FILE EXTENSION ▶ | IS EQUAL TO/MATCHES ▶ | PDF | WELL KEY FACTS ▶ | WELL REPORTS | DELETE | ADD/EDIT |
| AUTHOR<br>FILE ACCESSED DATE<br>FILE CREATED DATE<br>FILE EXTENSION<br>FILE MODIFIED DATE<br>FILE SIZE | | | | | | |

EDIT/VIEW CLASSIFICATION LIST | SAVE AND CLOSE

EDIT RULES

FIGURE 7A

COMPUTER IMPLEMENTED SYSTEM FOR ACCELERATING ELECTRONIC FILE MIGRATION FROM MULTIPLE SOURCES TO MULTIPLE DESTINATIONS

CROSS REFERENCE TO RELATED APPLICATIONS

The current application claims priority to and the benefit of U.S. Provisional Patent Application Ser. No. 61/557,552 filed on Nov. 9, 2011, entitled "SYSTEM FOR ACCELERATING ELECTRONIC FILE MIGRATION FROM MULTIPLE SOURCES TO MULTIPLE DESTINATIONS." This Reference is hereby incorporated in its entirety.

FIELD

The present embodiments generally relate to a system for accelerating electronic file migration from a plurality of sources to a plurality of destinations.

BACKGROUND

A need exists for a system for file migration that can identify, classify, copy electronic content, simulate a move, and then move files and optionally deleting files.

A further need exists for a system for file migration that is faster than conventional systems by providing a centralized migration profile for documents.

A need further exists for a system for file migration that provides an executive dashboard for quickly monitoring, tracking, providing indicators, and viewing particular details of a file migration by a plurality of users simultaneously.

The present embodiments meet these needs.

BRIEF DESCRIPTION OF THE DRAWINGS

The detailed description will be better understood in conjunction with the accompanying drawings as follows:

FIGS. 2A-2B are a diagram of the dynamic rules generation library usable in an embodiment.

FIGS. 3A-3C are a diagram of the administrative data storage usable in an embodiment.

FIG. 7A is a display of an editable classification rules screen usable in an embodiment.

Figure 1:
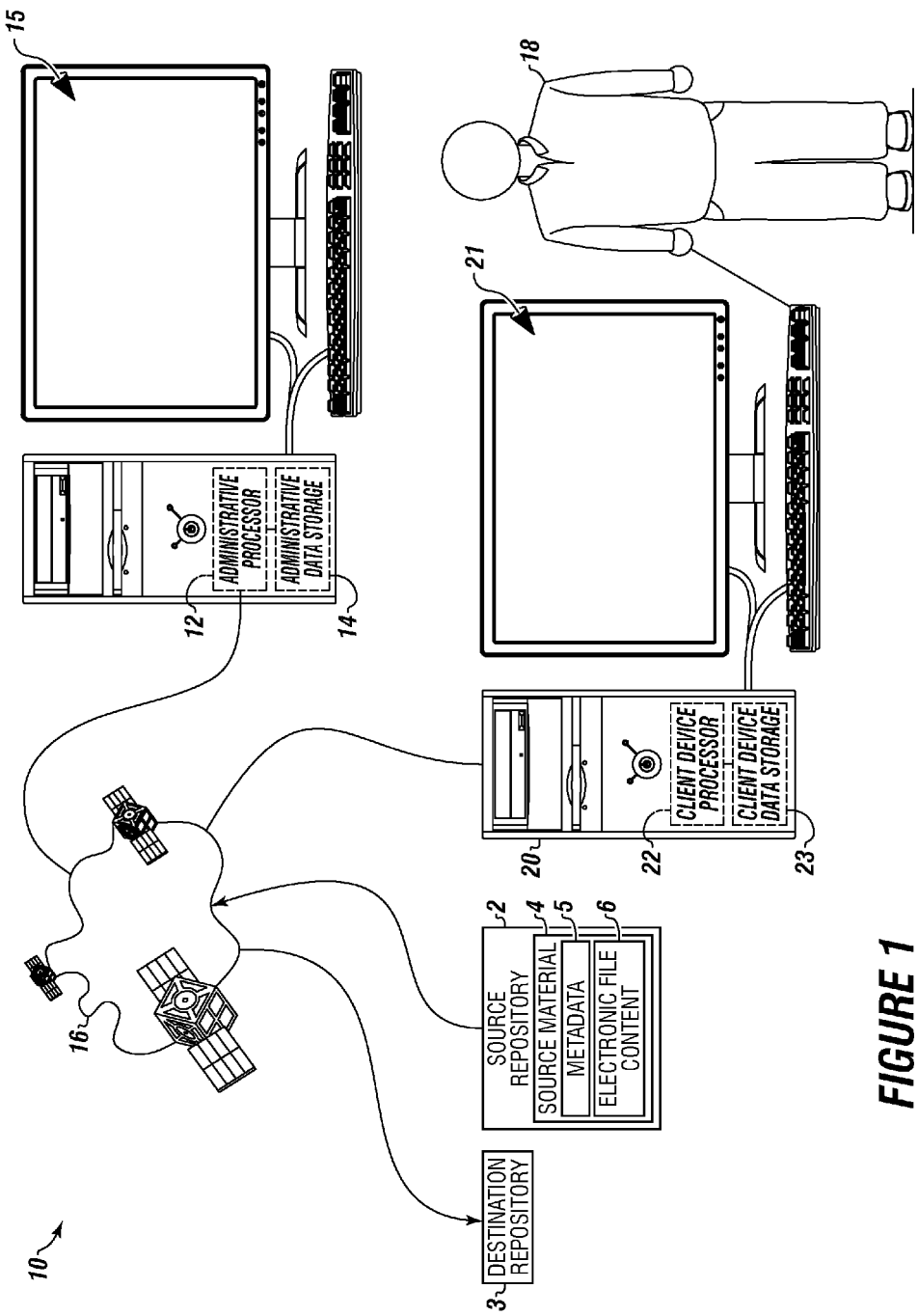
FIG. 1 is a diagram of the system usable in an embodiment.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments generally relate to a system for file migration, which identifies files from sources, classifies files, additionally deletes files and migrates the files to a plurality of destinations.

The present system can use three fundamental analytical processes for file migration, namely (i) analysis of the file content, (ii) analysis of file organization and (iii) migration of electronic files from a plurality of sources to a plurality of destinations.

The system can use computer instructions that plan file migration, design the migration, develop a profile of files to be migrated, implement the file migration, remove or maintain files not used in migration, and continue to migrate similar files as such files are created.

The system can integrate seamlessly with file share software and enterprise content management software such as Microsoft SHAREPOINT™, Open Text CONTENT SERVER™, FILENET™, DOCUMENTUM™ software.

The system can use a processor in communication with data storage.

The processor can communicate with a display over a network.

The processor can communicate with additional client devices, each having a display. The client devices and the processor can communicate via a network using at least two different gateway protocols.

The data storage can contain computer instructions.

The computer instructions can be installed on a client device data storage of a customer, or used as a server for an administrator that provides the service via a network.

The data storage, which can house the computer instructions, can include computer instructions to create a file inventory of the electronic files for migration and can store the file inventory in an electronic file migration database in the administrative data storage.

The data storage can include computer instructions to create a migration profile for moving the electronic files and computer instructions for storing the migration profile administrative data storage.

The data storage can include computer instructions to form a migration management console.

The migration management console can include a link to make a new migration profile.

A migration profile can include: (a) a migration project identifier; (b) a name of a user that sets up a migration profile; (c) a date the user set up the migration profile; (d) an additional description of the project for electronic file migration; (e) a source location for the electronic files; (f) a destination location for the electronic files; (g) a button with computer instructions allowing the deletion of a migration profile; (h) a button with computer instructions allowing profiles to be viewed and edited; (i) a link to computer instructions to perform a rule analysis on the file inventory to create an offline preview of the electronic files for migration as a verification file and transmit the verification file to a user.

The migration profile can include a profile name, a description, a progress log having a plurality of status and error messages, information related to completion of the file migration project, configuration settings, a list of input/outputs, a list of exclusions rules, and a list of classification rules.

The list of inputs and outputs can include input systems, output systems, source folder locations, destination folder locations, an add button, an edit button, a delete button; and a save and close button.

The data storage can also include computer instructions to perform a file inventory analysis on the file inventory.

These computer instructions to apply an inventory analysis can include computer instructions to apply exclusion rules to the file inventory, to apply classification rules to the file inventory to form an editable preview of the file inventory using the exclusion and classification rules, and to present the editable preview in the migration management console and then store the editable preview in the electronic file migration database.

The editable preview can be an online preview or an offline preview.

As an online preview, the editable preview can include a clear inventory button, a get inventory files button, an apply exclusions button, an apply classifications button, an apply filters button, an export button, and a run button.

Additional computer instructions in the administrative data storage can receive user feedback from an offline export or client device regarding the editable preview. The computer instructions can automatically update the file inventory analysis, which can create an updated editable file preview in an embodiment.

Additional computer instructions in the administrative data storage can include computer instructions to repeat the file inventory analysis, to repeat an acknowledgement of receipt of at least one user feedback, and to repeat automatic updating of the editable preview until preset file migration objectives are achieved.

The system can perform a file inventory analysis by using computer instructions stored on the data storage to apply exclusion rules to the file inventory. The system can simultaneously apply classification rules to the file inventory to form an editable preview of the file inventory.

Computer instructions can then store the editable preview as an electronic file on the administrative server or on the client device.

Additionally computer instructions can allow the editable preview to be an online preview or to be transmitted to a user as an offline preview.

In one or more embodiments, the file inventory analysis can include computer instructions that can flag documents for exclusion with an indicator.

In one or more embodiments, the system can have computer instructions which can analyze electronic files by sorting by file properties and file metadata and by filtering by file properties and file metadata.

The data storage can also include computer instructions to receive user feedback from an offline export or client device regarding the offline preview and automatically update the file inventory analysis creating an updated offline file preview.

In another embodiment, the system can use computer instructions to repeat the file inventory analysis, as well as repeat receipt of user feedback and repeat automatic updating of the offline preview until preset file migration objectives are achieved.

In still another embodiment, the system can use computer instructions that create an audit track of the user changes to the migration profile, as well as create file inventory with dates, and names.

An embodiment of the system can include computer instructions which can migrate the electronic files associated with the updated offline preview or updated online preview to user designated destinations.

In one or more embodiments, the system can include computer instructions which can use reference files to populate the file inventory with additional file metadata.

In one or more embodiments, the system can include computer instructions to delete migrated documents from source locations, and computer instructions to use XML in migration.

The system can include computer instructions which can include selecting source locations with file content for migration based on user designated criteria.

Turning now to the Figures, FIG. 1 depicts a schematic of a system according to one or more embodiments.

FIG. 1 shows the computer implemented system 10 for migrating source material 4 made of metadata 5 and electronic file content 6 from a source repository 2 to a destination repository 3.

The system can include an administrative processor 12 with administrative data storage 14 connected to a network 16 for communication with a user 18 having a client device 20 with a client device processor 22 and a client device data storage 23 connected to the network.

An administrative display 15 can connect to the administrative processor 12 which can be a laptop or another type of computer.

A client device display 21 can connect to the client device processor 22 which can be a touch screen for a cell phone, a laptop, or another computer.

Figure 2B:
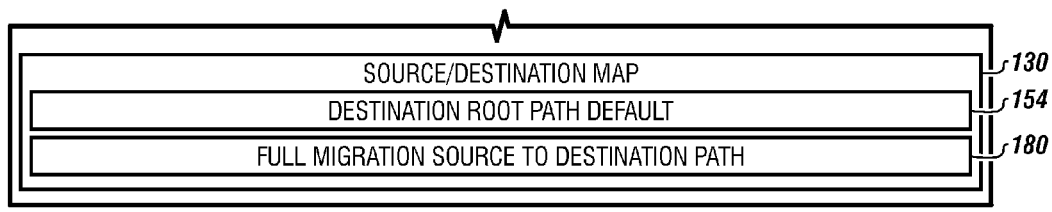

FIGS. 2A and 2B is a diagram of a portion of the dynamic rules generation library 26.

The dynamic rules generation library 26 can include editable classification rules 28 such as Human Resources; classification rule entries 29; classification comparison rules 30, such as File Created Date; a classification operation rules 32, such as Is Less Than; classification rule values 34 such as One Year; a classification title 36 such as Benefits; and classification rule descriptions 38 such as All Benefit Files Prior to 2012, see FIG. 7A. The editable classification rules 28 can contain the classification rule entries 29, classification comparison rules 30, classification operation rules 32, classification rule values 34, a classification title 36, classification rule descriptions 38, or combinations thereof.

Figure 6:
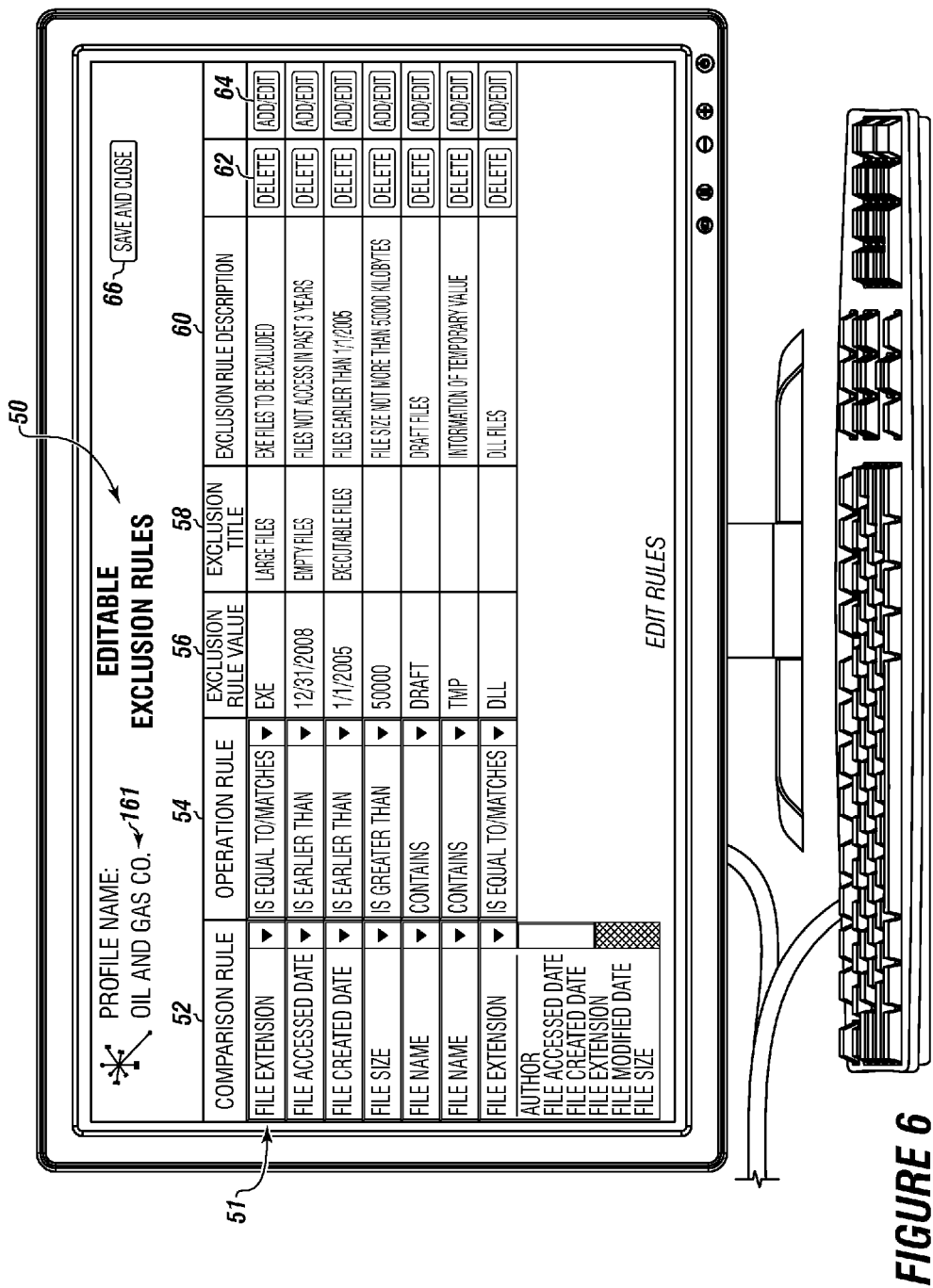
FIG. 6 is a display of an editable exclusion rules screen of an embodiment.

The dynamic rules generation library can include editable exclusion rules 50, with exclusion rule entries 51; exclusion comparison rules 52 such as File Size; exclusion operation rules 54 such as Is Greater Than; exclusion rule values 56 such as 50,000; exclusion value titles 58 such as Large Files; and exclusion rule descriptions 60 such as Files Larger than 50,000 bytes, see FIG. 6.

Figure 10:
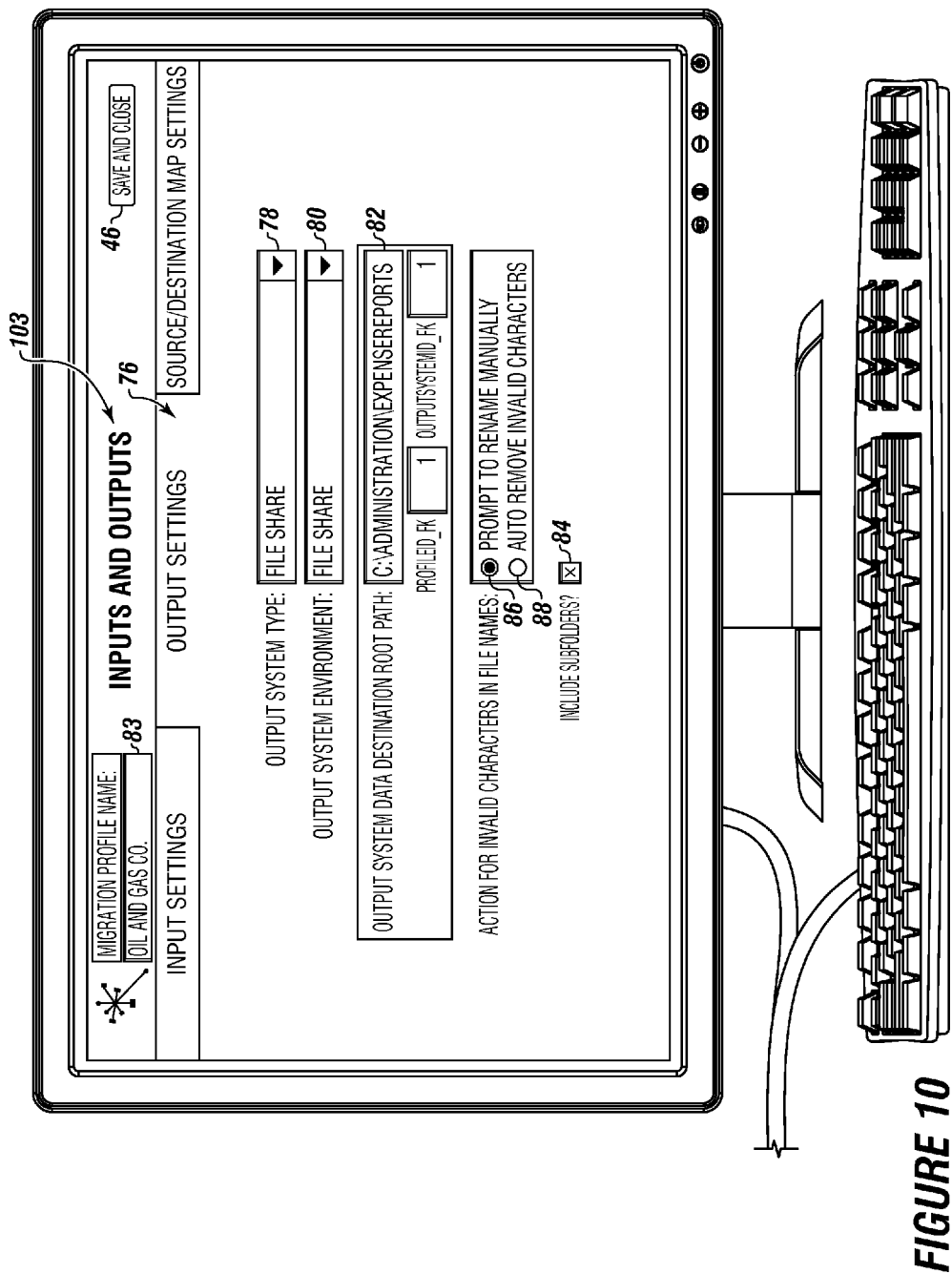
FIG. 10 is a display of an inputs and outputs screen showing output settings information.

The dynamic rules generation library 26 can include output settings 76, with an output system type 78 such as Content Server, an include output subfolders indicator 84 such as a Checkbox, an indicator prompt to rename manually 86 which renames the files such as a Radio Button, an indicator to auto-remove invalid characters 88 from filenames such as a Radio Button, see FIG. 10.

The dynamic rules generation library 26 can include in the output settings 76, an output system environment 80 such as SharePoint, and an output system data destination root path 82 such as c:\humanresources\houston\employeefiles, see FIG. 10.

Figure 9:
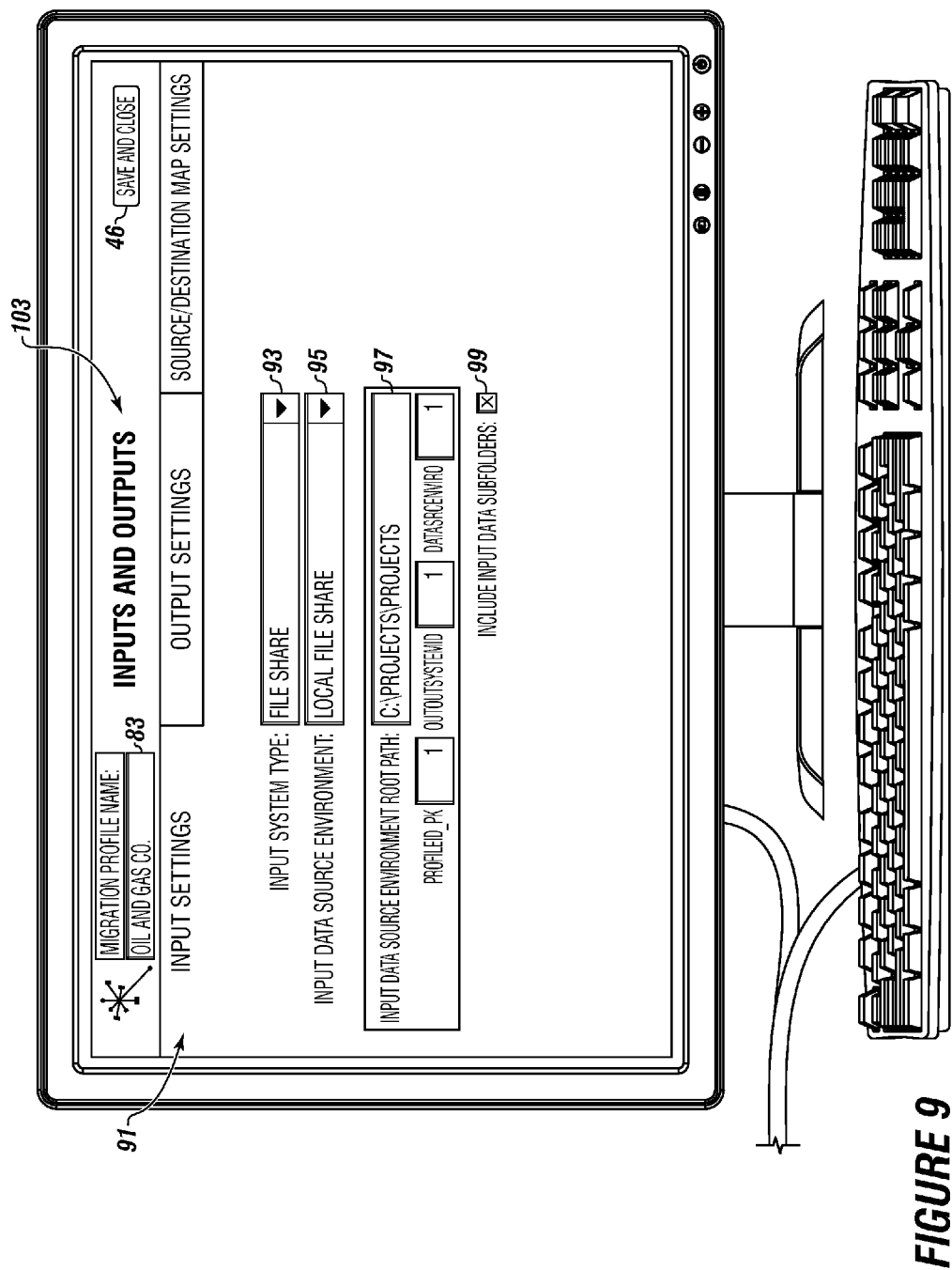
FIG. 9 is a display of an inputs and outputs screen showing input settings information.

The dynamic rules generation library 26 can include input settings 91 with an input system type 93 such as Alchemy, an input data source environment 95 such as Networked File Share; an input data source environment root path 97 such as c:\\administration\weekly meetings, and an include input data subfolders indicator 99 which can be a Checkbox, see FIG. 9.

Figure 13:
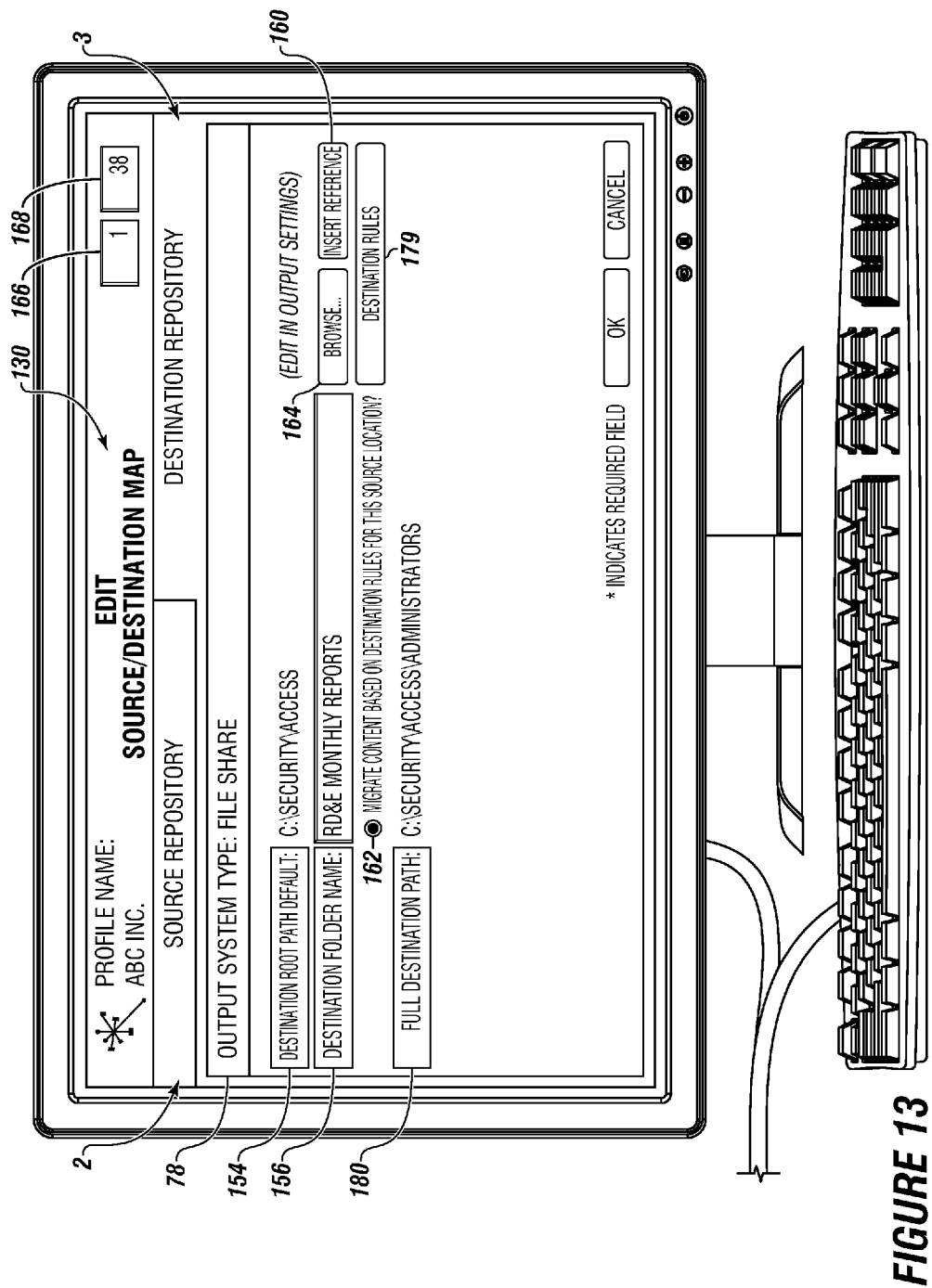
FIG. 13 is a display of an edit source/destination map showing destination repository information.

The dynamic rules generation library 26 can include a source/destination map 130 with a destination root path default 154 such as c:\healthandsafety\ and a full migration source to destination path 180, such as c:\healthandsafety\material data sheets\2012\, see FIG. 13.

Figure 3A:
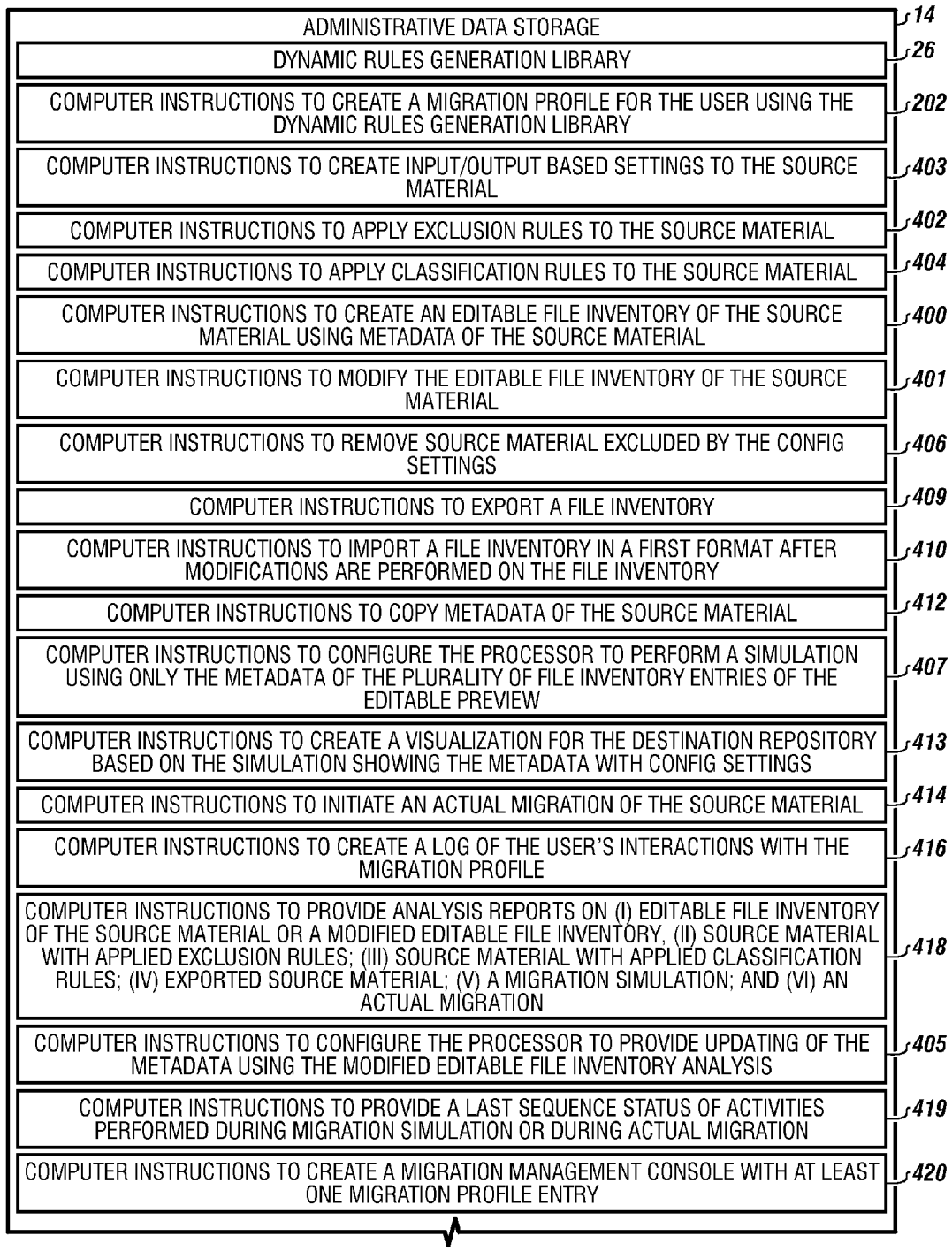

FIG. 3A is a diagram of an administrative data storage 14 usable in an embodiment.

The administrative data storage 14 can contain the dynamic rules generation library 26 depicted in FIGS. 2A and 2B

To understand the computer instructions which reside in the administrative data storage, the computer instructions should be viewed together with the various display screens that follow as FIGS. 4-13.

The invention is an accelerated electronic file migration system for migrating source material that includes metadata and electronic file content from a source repository to a destination repository.

The system includes the components described in FIG. 1 and uses the dynamic rules generation library of FIGS. 2A and 2B to perform a sequence of steps using the computer instructions detailed in FIGS. 3A, 3B, and 3C.

First, the system can use the computer instructions to create a migration profile for electronic file content to be moved from the source repository to the destination repository.

At minimum, the migration profile can include a profile name and config settings that create settings for classification rules and exclusion rules, as well as input and output settings and a plurality of profile entries for the migration profile.

Additionally, the migration profile can be used to create inventory files using metadata of the source material.

The system can then use computer instructions to apply various config settings to the source material.

The system can use computer instructions to activate a simulation of the migration by copying metadata of the source material; and creating a visualization for the destination repository showing the metadata using the config settings which include input/output settings, classification rules and exclusion rules.

In addition to the ability to run a simulation using the metadata of the source material, the system can also initiate an actual migration of the electronic file content of the source material.

The system can use a progress log formed from computer instructions in the administrative data storage that provides a last sequence status of activities performed during migration simulation or during actual migration.

Finally the system can have a migration management console that can act as an executive dashboard, showing twenty-four hours a day, and seven days a week at least one migration profile and the status of elements of the migration, the simulation, or combinations thereof.

The accelerated system for document migration can have other features.

Returning now to FIGS. 3A, 3B and 3C, the administrative data storage can include computer instructions 202 to create a migration profile for the user using the dynamic rules generation library.

Many of the computer instructions in the administrative data storage connect to certain buttons or fields on the display screens of FIGS. 4-13, however, some of the computer instructions do not specifically tie to buttons. The following are the computer instructions that do not tie to specific buttons shown in FIGS. 4-13, but are used in the migration. The remaining computer instructions are grouped with regard to a Figure that displays the associated button for clarity of connection between the computer instructions and specific buttons shown in the Figures.

The administrative data storage 14 can include computer instructions 434 to verify that the simulated migration of the file inventory was completed from the source repository to the destination repository with fewer than a preset number of client allowable errors.

The verification can be viewed on the migration profile in the progress log.

An example of a preset number of client allowable errors is 15 percent.

An example of the verification that the migration of the file inventory is complete with fewer than the preset number of client approved errors would be seen in the progress log.

The administrative data storage 14 can include computer instructions 435 to revise the migration profile, changing config settings when the migration is completed with errors greater than the preset number of client allowable errors.

The revision of the migration can be viewed on the migration profile in the audit log, the changing of config settings when the migration is completed with errors greater than the preset number of client allowable errors can be viewed on the migration profile in the audit log.

The administrative data storage 14 can include computer instructions 436 to migrate the source material after simulation with fewer than the preset number of client allowable errors has occurred.

Figure 4:
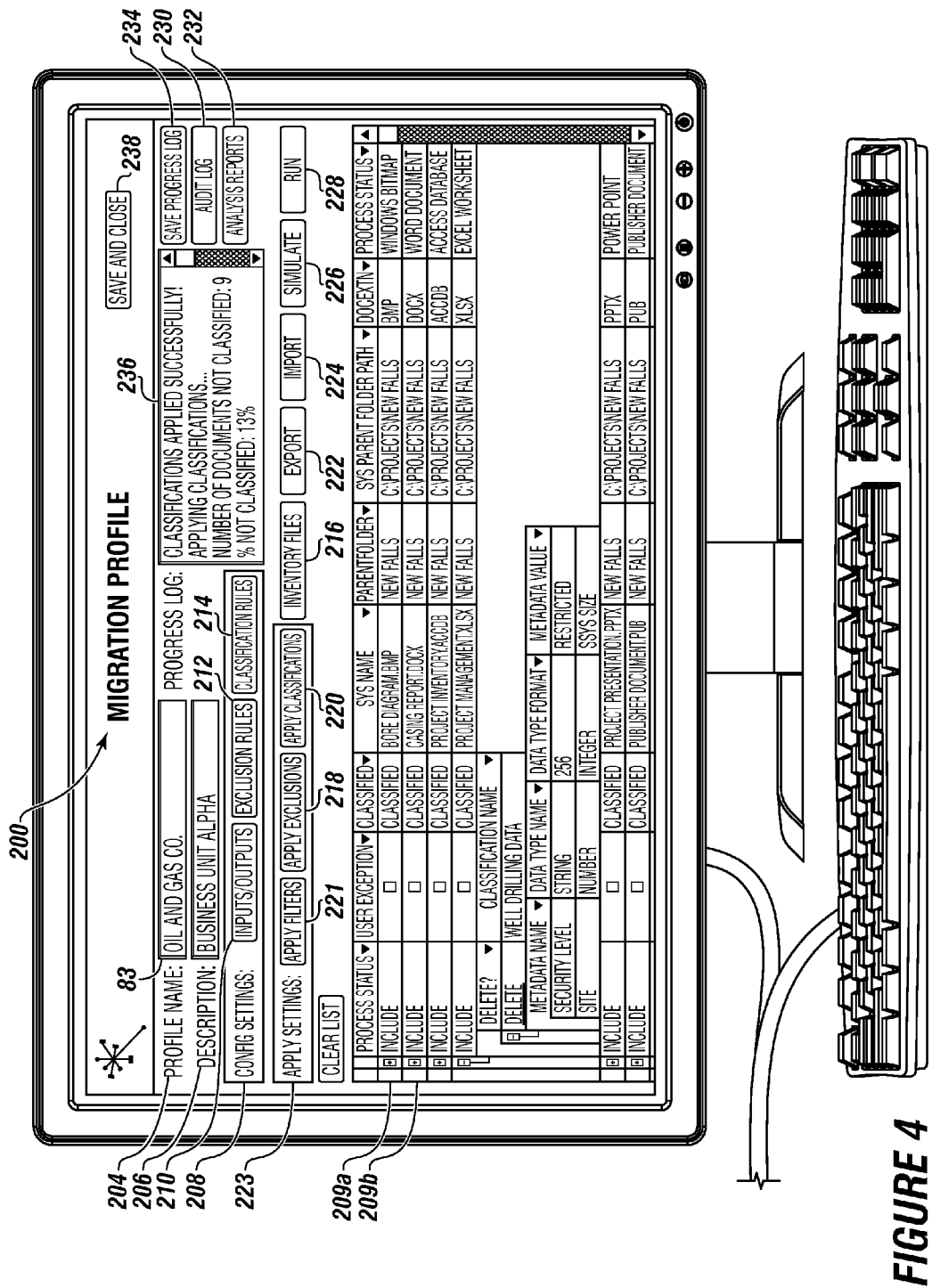
FIG. 4 is a display of a migration profile usable in an embodiment.

These computer instructions 436 can be activated by using the run button 228 on the migration profile shown in FIG. 4.

Computer Instructions Related to FIG. 4

FIG. 4 shows a display of the migration profile 200 according to an embodiment with a plurality of file inventory entries 209a and 209b. FIG. 4 can be best understood with reference to the computer instructions stored in the administrative data storage depicted in FIGS. 3A, 3B, and 3C, as well as the dynamic rules generation library depicted in FIGS. 2A and 2B.

The administrative data storage can contain computer instructions 400 to create an editable file inventory of the source material using metadata of the source material.

The computer instructions 400 can be linked to an inventory files button 216 shown in FIG. 4 on the migration profile 200.

The editable file inventory can be formed by taking metadata from source material.

The administrative data storage can include computer instructions 401 to modify the editable file inventory of the source material.

The administrative data storage 14 can include computer instructions 402 to apply exclusion rules to the source material.

Exclusion rules can be applied and files can be removed from the inventory according to the exclusion rules.

The computer instructions 402 can be linked to an apply exclusion rules button 218 shown in FIG. 4.

The administrative data storage can include computer instructions 403 to create input/output based settings for the source material. The computer instructions 403 are linked to a create input/output button 210 shown in FIG. 4.

The input/output settings can be created by selecting the input system type 93, the input data source environment 95, the input data source environment root path 97, the output system type 78, the output system environment 80, and the output system data destination root path 82.

The administrative data storage can include computer instructions 404 to apply classification rules to the source material; and combinations thereof. The computer instructions 404 can be linked to the apply classification rules button 220 shown in FIG. 4.

The classification rules are applied by adding or updating metadata associated with the source content as defined by the selected classification rules.

The administrative data storage can include computer instructions 406 to remove source material excluded by the config settings. The computer instructions 406 can be connected to the apply filter button 221 shown in FIG. 4.

The source material selected for removal can be identified by the exclusion rules.

The administrative data storage can include computer instructions 409 to export a file inventory. The computer instructions 409 can be linked to the export button 222 shown in FIG. 4.

The export of the file inventory can be achieved by saving the file inventory to a separately named file using a specified root path.

The administrative data storage can include computer instructions 410 to import a file inventory in a first format after modifications are performed on the file inventory. The computer instructions 410 can be linked to the import button 224 shown in FIG. 4.

The import of the file inventory can be performed by importing the metadata 5 of the source material 4 from the file inventory in a first format after modifications are performed on the file inventory, and combinations thereof.

The administrative data storage can include computer instructions 412 to copy metadata of the source material.

The copying of the metadata 5 can be achieved by copying metadata 5 remaining after applying the config settings 208 to the source material.

The administrative data storage can include computer instructions 407 to configure the processor to perform a simulation using only the metadata of the plurality of file inventory entries of the editable preview.

The administrative data storage can include computer instructions 413 to create a visualization for the destination repository based on the simulation showing the metadata with config settings.

The creation of the visualization for the destination repository can look like a hierarchically organized, sorted or prioritized collection of source material 4, or combinations thereof.

Both of the computer instructions 412 and 413 can be linked to the simulate button 226 shown in FIG. 4.

The administrative data storage 14 can include computer instructions 414 to initiate an actual migration of the source material. The computer instructions 414 can be linked to the run button 228 shown in FIG. 4.

To cause the actual migration of the source material 4 from the source repository 2 to the destination repository 3 using the config settings of the migration profile, the run button 228 is activated.

The administrative data storage can have computer instructions 416 to create a log of the user's interactions with the migration profile.

The computer instructions 416 can be linked to the audit log button 230 shown in FIG. 4.

An example of the user's interactions includes creation of an exclusion rule.

The administrative data storage can include computer instructions 418 to provide analysis reports on (i) an editable file inventory of the source material or a modified editable file inventory, (ii) source material with applied exclusion rules; (iii) source material with applied classification rules; (iv) exported source material; (v) a migration simulation; and (vi) an actual migration. The computer instructions 418 can be linked to the analysis report button 232 shown in FIG. 4.

For example, source material with applied exclusion rules can be human resources source materials from 2012 excluding benefits source material.

For example, source material with applied classification rules can be well drilling data files with Houston in the file name.

For example, exported source material can be administrative reports from 2012 for the Seattle location.

For example, a migration simulation could be a migration of metadata 5 for an offshore rig located in the Gulf of Mexico from a local file share to a discovery repository.

For example, an actual migration could be migrating metadata 5 and electronic file content 6 for an offshore rig located in the Gulf of Mexico from a local file share to a discovery repository.

The administrative data storage can include computer instructions 405 to configure the processor to provide updating of the metadata using the modified editable file inventory analysis.

The administrative data storage can include computer instructions 419 to provide a last sequence status of activities performed during migration simulation or performed during actual migration. The computer instructions 419 can be linked to the progress log 236 shown in FIG. 4.

An example of providing the last sequence status of activities performed during migration simulation is 55 percent of files successfully classified.

An example of providing the last sequence status of activities performed during actual migration is 82 percent of files successfully classified.

Returning again to FIG. 4 and the migration profile 200, the following computer instructions can be used with that profile.

The administrative data storage can include computer instructions 452 to create exclusion rules.

The term "create exclusion rules" as used herein means to identify the source material that should not be included in the migration based on user selected parameters.

The computer instructions 452 can be linked to the create exclusion rule button 212 shown in FIG. 4.

The administrative data storage can include computer instructions 454 to create classification rules.

The phrase "create classification rules" as used herein means to apply metadata to the source material that should be included in the migration based on user selected parameters The computer instructions 454 can be linked to the create classification rule button 214 shown in FIG. 4.

The administrative data storage can include computer instructions 456 to extract information from the progress log into a separate file form.

The term "extract information from the progress log into a separate file form" as used herein means to save the contents of the progress log into a readable file such that a user can understand the status.

The computer instructions 456 can be linked to the migration profile save progress log button 234 shown in FIG. 4.

The administrative data storage can include computer instructions 458 to save and close the migration profile at any point during use.

The computer instructions 458 can be linked to the migration profile save and close button 238 shown in FIG. 4.

Figure 5:
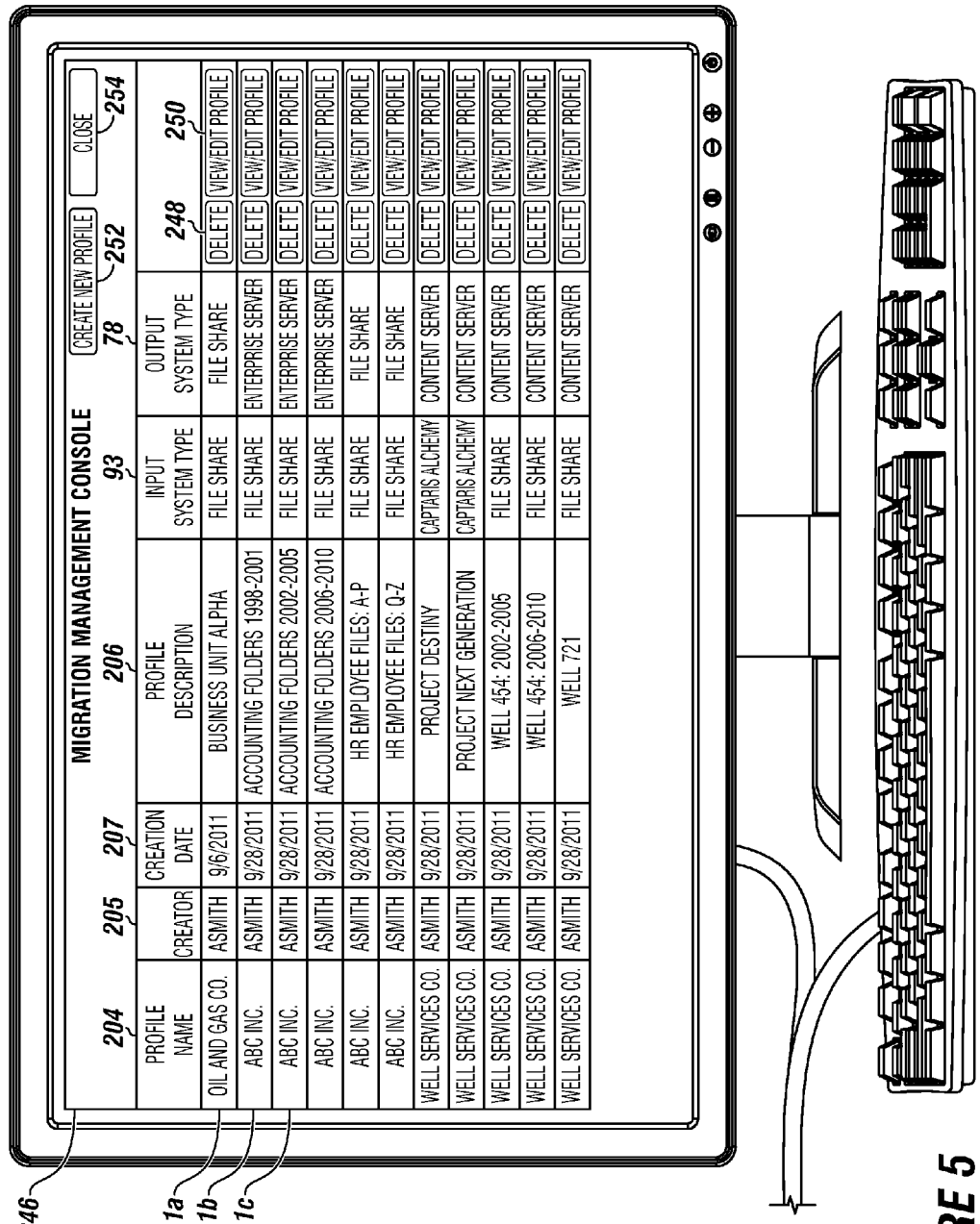
FIG. 5 is a display of a migration management console usable in an embodiment.

Computer Instructions Related to FIG. 5

FIG. 5 can be best understood with reference to the computer instructions stored in the Administrative Data Storage depicted in FIGS. 3A, 3B, and 3C, as well as the Dynamic Rules Generation Library depicted in FIGS. 2A and 2B.

The administrative data storage can include computer instructions 420 to create a migration management console 246 with at least one migration profile entry 211 as shown in FIG. 5.

FIG. 5 depicts a display of a migration management console with a plurality of migration profile entries 211a, 211b and 211c, according to one or more embodiments.

The administrative data storage can include computer instructions 422 to delete migration profile entries 211a, 211b, and 211c in the migration management console 246. The computer instructions 422 can be linked to a migration console delete button 248 shown in FIG. 5.

The migration console delete button can be used to delete a migration profile entry 211.

The administrative data storage can include computer instructions 424 to view one of the migration profile entries 211, edit one of the migration profile entries 211, or combinations thereof. The computer instructions 424 can be linked to the migration management console view/edit profile button 250 shown in FIG. 5.

The view/edit profile button 250 allows the user to see a display of and modify a migration profile 200.

The administrative data storage can include computer instructions 408 to configure the processor to display audit logs, wherein the audit logs comprise information relating to changes made by the user to the migration profile.

The administrative data storage can include computer instructions 426 to create a new migration profile. The computer instructions 426 can be linked to a create new profile button 252 shown in FIG. 5.

The "create new profile" button 252 can allow the user to generate a migration profile 200 specifying a name and config settings.

The administrative data storage can include computer instructions 460 to save and close the migration management console at any point during use. The computer instructions 460 can be linked to the migration management console close button 254 shown in FIG. 5.

Computer Instructions Related to FIG. 6

The administrative data storage can include computer instructions related to the display shown in FIG. 6 titled "editable exclusion rules" 50.

The administrative data storage can include computer instructions 462 to delete an exclusion rule entry.

The phrase "delete an exclusion rule entry" as used herein means to delete an entry from the list of exclusion rule entries 51 for the migration profile 200.

The computer instructions 462 can be linked to the exclusion rule delete button 62 shown in FIG. 6.

The administrative data storage can include computer instructions 464 to edit or add to an exclusion rule entry 51 presented in FIG. 6. The computer instructions 464 can be linked to the exclusion rule edit/add button 64 shown in FIG. 6.

The phrase "edit or add to an exclusion rule entry" as used herein means to add a new entry or to edit an existing entry of exclusion rule entries 51 for the migration profile 200.

The administrative data storage can include computer instructions 466 to save and close editable exclusion rules at any time during use. The computer instructions 466 can be linked to the exclusion rule save and close button 66 shown in FIG. 6.

The administrative data storage can include computer instructions 468 to delete a classification rule entry.

The phrase "delete a classification rule entry" as used herein means to delete an entry from the list of classification rule entries 29 for the migration profile 200.

Computer Instructions Related to FIG. 7A

The administrative data storage can include computer instructions 438 to save and close the actual migration, the migration simulation, or combinations thereof, at any point of the migration.

These computer instructions 438 can be connected to the classification save and close button 46 shown in FIGS. 7A, 7B, 9, 10, and 11.

The computer instructions can present an editable classification rules display 28 shown in FIG. 7A. The following computer instructions relate to that display.

The administrative data storage can include computer instructions 446 to edit/view a classification list, which means to edit or view one of the classification comparison rules 30, the classification operation rules 32, the classification rule values 34, the classification title 36, the classification rule descriptions 38, and combinations thereof as shown in FIG. 7A.

Computer instructions 468 can connect to the delete button 40 shown in FIG. 7A allowing individual entries 29 to be deleted from the editable classification rules.

The term "classification comparison rules" means the metadata 5 to be compared in the classification rule entry 29.

The term "classification operation rules" is defined to be the comparison operation to be used in a given classification rule entry 29.

The term "classification rule values" as used herein means the value that the metadata 5 will be compared against in a given classification rule entry 29.

The term "classification title" as the phrase is used herein refers to the name of the selected classification to be assigned to a given classification list entry when a given comparison rule 30 combined with a given operation rule 32 and combined with a classification rule value 34 is true.

The term "classification rule descriptions" is defined as the description assigned to a given classification rule entry 29.

The computer instructions 446 can be linked to the edit/view classification list button 44 shown in FIG. 7A which is a display of the editable classification rules.

The administrative data storage can include computer instructions 448 to save and close the editable classification rules. The computer instructions 448 can be linked to the save and close button 46 shown in FIG. 7A. The same button can close and save several of the displays and these computer instructions include the computer instructions for each display as mentioned above.

The administrative data storage can include computer instructions 450 to provide an edit and view edited classification rules 28 of FIG. 7A, displaying the classification title 36 and classification rule description 38 of the migration profile.

The computer instructions 468 can be linked to the classification rule delete button 40 shown in FIG. 7A.

The administrative data storage can include computer instructions 470 to edit or add to a classification rule entry.

The phrase "edit or add to a classification rule entry" as used herein means a user can modify a classification rule entry 29.

The computer instructions 470 can be linked to the classification rule edit/add button 42 shown in FIG. 7A.

Figure 7B:
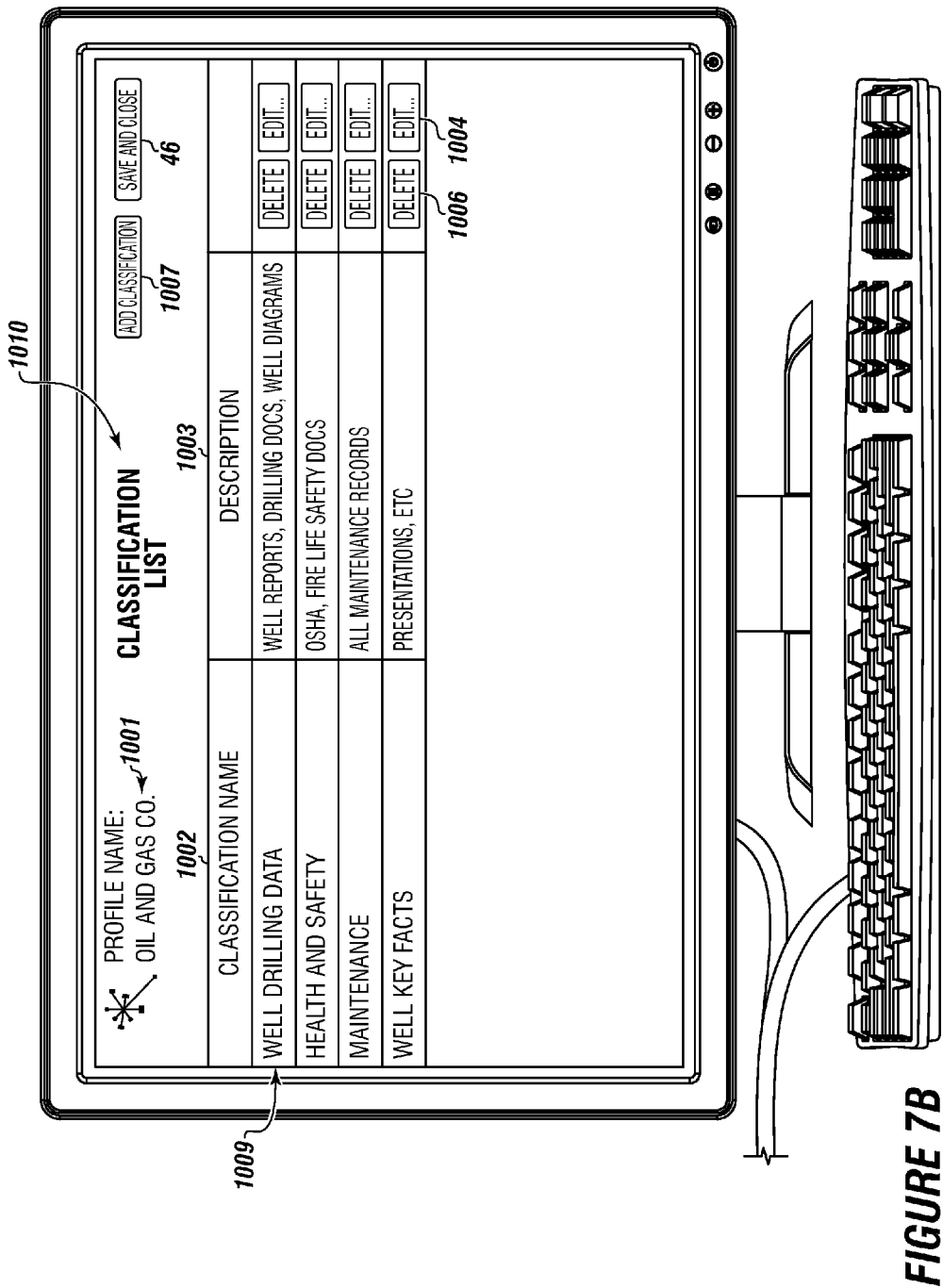
FIG. 7B is a display of a classification list.

Computer Instructions Related to FIG. 7B

The administrative data storage can include computer instructions 524 to delete an entry from the classification list related to button 1006 of FIG. 7B.

The administrative data storage can include computer instructions 526 to add a classification list item linked to button 1007 of FIG. 7B.

The administrative data storage can include computer instructions 528 to save and close the classification list.

Figure 8:
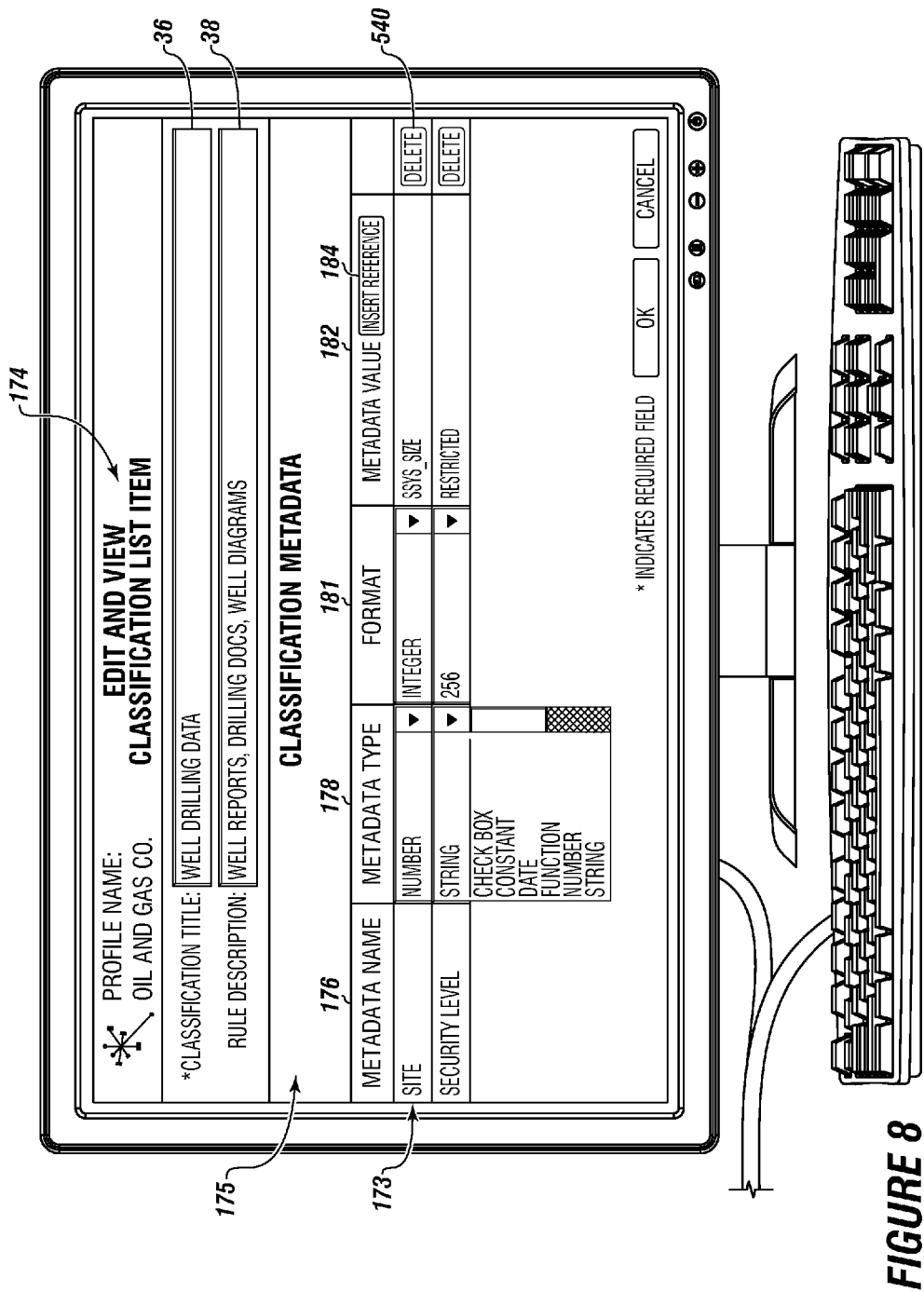
FIG. 8 is an edit and view classification list item display according to an embodiment.

Computer Instructions Related to FIG. 8

The administrative data storage can include computer instructions 522 to delete a metadata rule entry 173. The computer instructions 522 can be linked to the classification metadata delete button 540.

The administrative data storage can include computer instructions 472 to configure the processor for selecting and inserting a reference into the metadata value.

The phrase "selecting and inserting a reference to into the metadata value" means to place a file attribute into the metadata value for the metadata rule entry 173.

The computer instructions 472 can be linked to the insert reference button 184 shown in FIG. 8.

Figure 11:
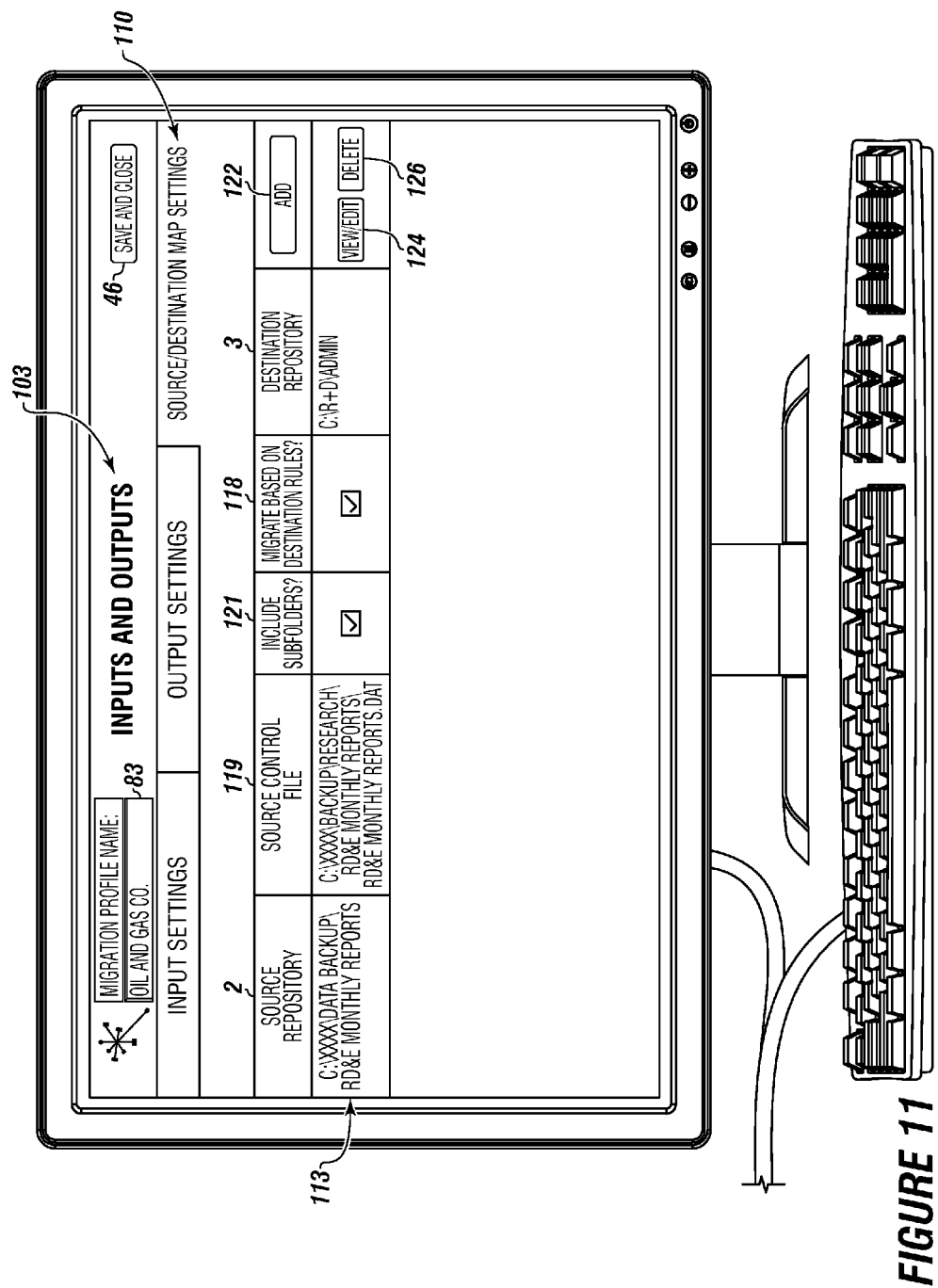
FIG. 11 is a display of an inputs and outputs screen showing source/destination map settings information.

Computer Instructions Related to FIG. 11

The administrative data storage can include computer instructions 476 to add source/destination map rule entries 113. The computer instructions 476 can be linked to the map add button 122 shown in FIG. 11.

The administrative data storage can include computer instructions 478 to view/edit source/destination map rule entries 113. The computer instructions 478 can be linked to the map view/edit button 124 shown in FIG. 11.

The administrative data storage can include computer instructions 480 to delete source/destination map rule entries 113. The computer instructions 480 can be linked to the map delete button 126 shown in FIG. 11.

Figure 12:
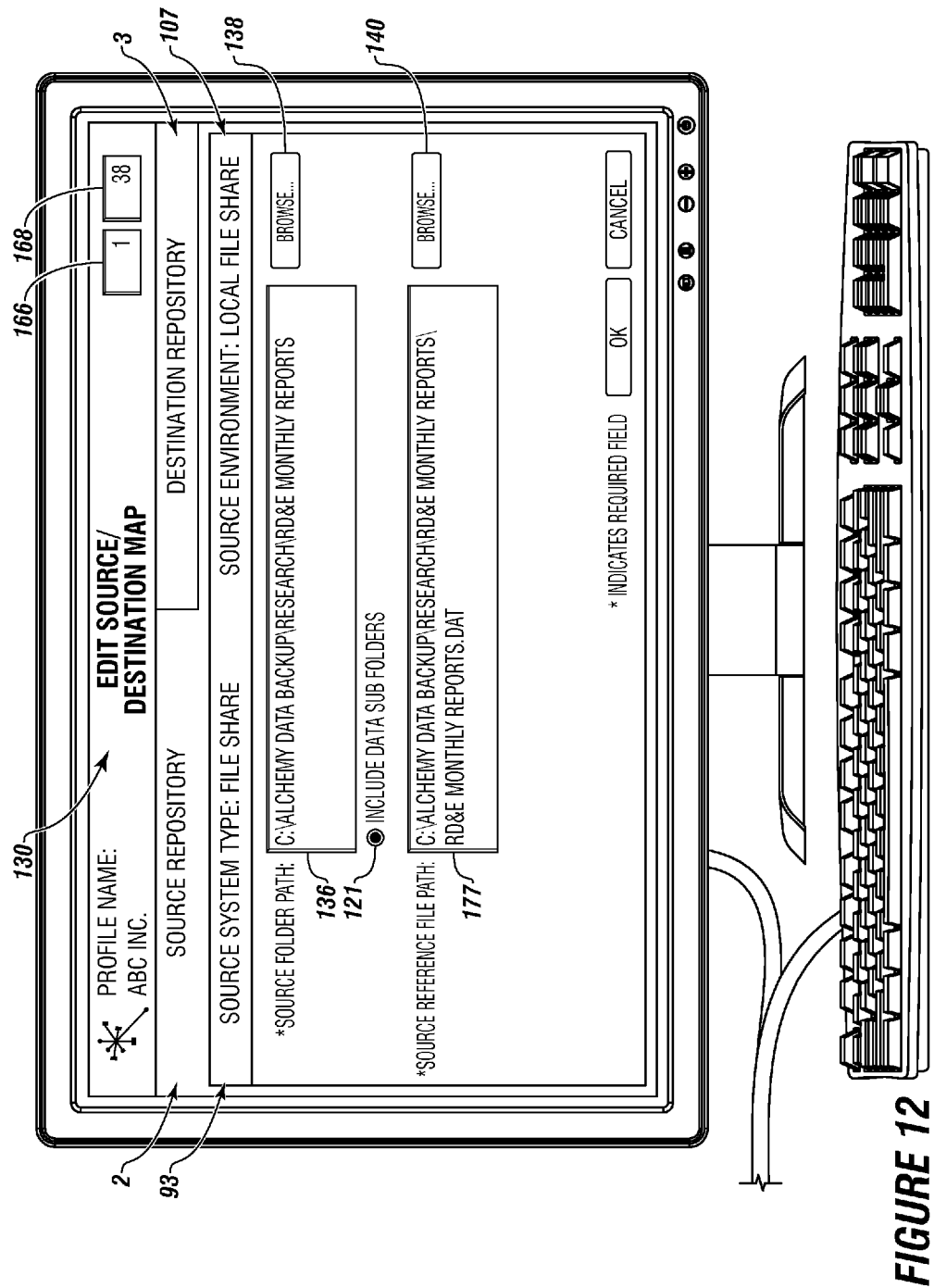
FIG. 12 is a display of an edit source/destination map showing source repository information.

Computer Instructions Related to FIG. 12

The computer instructions in the administrative data storage can also relate to other displays. The following computer instructions relate to the display of FIG. 12.

The administrative data storage can include computer instructions 442 to browse the source folder paths.

The term "source folder path" as used herein means the hierarchical folder location where the source material 4 resides.

The computer instructions 442 can be linked to the source folder path browse button 138 shown in FIG. 12.

The administrative data storage can include computer instructions 482 to browse the source reference file paths.

The term "source reference file path" as the term is used herein means The hierarchical folder location where the source material resides.

The computer instructions 482 can be linked to the source reference file path browse button 140 shown in FIG. 12.

The administrative data storage can include computer instructions 481 to identify references to be inserted into source material 4 prior to migration. The computer instructions 481 can be linked to display the source reference file path 177 shown in FIG. 12.

Computer Instructions Related to FIG. 13

The administrative data storage can include computer instructions 484 to browse root maps in the administrative data storage between a source repository and a destination repository. The computer instructions 484 can be linked to the source destination root map browse button 164 shown in FIG. 13.

The administrative data storage can include computer instructions 486 to configure the processor to browse references inserted into the root maps. The computer instructions 486 can be linked to the source destination insert reference button 160 shown in FIG. 13.

The administrative data storage can include computer instructions 488 to apply additional destination rules to file inventory. The computer instructions 488 can be linked to the destination rules button 179 shown in FIG. 13.

The administrative data storage can include computer instructions 536 to provide a "this folder indicator"166 and a "total folders indicator" 168 as shown in FIG. 13.

Now that the details of FIGS. 3A, 3B, and 3C are understood, it is possible to return to the elements of FIGS. 4-13 in more detail.

FIG. 4 is a display of a migration profile usable in an embodiment of the invention.

As shown in FIG. 4, the migration profile 200 can be comprised of a profile name 83, a profile name 204, a description 206, config settings 208, a form inventory files button 216, an export button 222, an apply settings component 223, an import button 224, a simulate button 226, a run button 228, an audit log button 230, an analysis reports button 232, a save progress log 234, a progress log 236, and a save and close button 238.

The apply settings component 223 can contain an apply exclusion rules button 218, an apply classification rules button 220, and an apply filters button 221.

The config settings 208 can comprise a create input/output settings button 210, a create exclusion rule button 212, and a create classification rule button 214.

FIG. 5 is a display of a migration management console that manages at least one and up to 10,000 migration profiles, each having a profile name 204.

As shown in FIG. 5, the migration management console 246 can contain a save and close button 254, an output system type 78, an input system type 93, a profile name 204, a migration profile creator 205, a migration profile description 206, a migration profile creation date 207, migration profile entries 211, a migration console delete button 248, a migration console view/edit profile button 250, and a create new profile button 252.

FIG. 6 is a display of editable exclusion rules usable in an embodiment.

As shown in the FIG. 6, the display of editable exclusion rules 50 can include an exclusion comparison rule 52, an exclusion operation rule 54, an exclusion rule value 56, an exclusion value title 58, an exclusion rule description 60, an exclusion rule delete button 62, an exclusion rule edit/add button 64, an exclusion rule save and close button 66, and a plurality of exclusion rule entries, one of the entries is identified as element 51.

Element 161 is a presentation of an actual name of the oil and gas company shown in the profile name.

FIG. 7A is an editable classification rules display 28 according to an embodiment.

As shown in FIG. 7A, the editable classification rules can include at least one classification rule entry 29, seven are shown.

Additionally, the editable classification rules 28 can present an indication of the following: a classification comparison rule 30, a classification operation rule 32, a classification rule value 34, a classification title 36, a classification rule description 38, a classification rule delete button 40, a classification rule edit/add button 42, an edit/view classification list button 44, and a save and close button 46.

FIG. 7B depicts a resulting classification list 1010 that can occur when the edit/view classification list button 44 of FIG. 7A is actuated.

The classification list 1010 can include a classification name 1002, a description 1003, and at least one individual classification list entry 1009. In this Figure, four classification list entries are shown, the classification list entry 1009 has the name "well drilling data" the remaining entries have the names "health and safety", "maintenance" and "well key facts".

This FIG. 7B also displays the company name as the profile name 1001 for these individual classification list entries 1009.

The "edit . . . " button 1004 can be for each individual classification list entry. The "edit . . . " button can allow the individual classification entries 1009 to be edited. The "delete" button 1006 can allow an individual classification entry to be deleted. Each individual classification list entry can have a delete button.

The save and close button 46 can actuate computer instructions in the administrative data storage to save the classification list of individual entries for the named company of the profile name. The "add classification" button 1007 is a button that can actuate computer instructions, as mentioned earlier referencing FIGS. 3A-3C, which add an individual classification entry to the classification list.

FIG. 8 is a display of an edit and view classification list item.

As shown in FIG. 8, the edit and view classification list item display 174 can include a classification title 36, a classification rule description 38 for the displayed classification title, and a classification metadata display 175.

The classification metadata display 175 can contain at least one metadata rule entry 173.

Each metadata rule entry can have a metadata name 176, an example of which is shown as "site"; a metadata type 178, an example of which is shown as "number"; a format 181, an example of which is shown as "integer"; a metadata value 182, an example of which is shown as "SSYS_size"; an insert reference button 184; and a classification metadata delete button 540.

FIG. 9 is a display of input settings 91 for inputs and outputs 103 according to an embodiment.

As shown in FIG. 9, the display of the inputs and outputs 103 for the migration profile can include a save and close button 46, a profile name 83, and an input settings title area 91.

The input settings display area 91 can present an input system type 93, an input data source environment 95, an input data source environment root path 97, and an include input data subfolders indicator 99.

FIG. 10 is a display of output settings 76 for inputs and outputs 103 according to an embodiment.

As shown in FIG. 10, the display of output settings 76 can include a save and close button 46, output system type field 78, an output system environment field 80, an output system data destination root path 82, an include output subfolders indicator 84, a radio button style indicator to indicate "prompt to rename manually" individual files 86, and a radio button style indicator to indicate "auto-remove invalid characters" 88.

FIG. 10 shows a migration profile name 83 in this example, "oil and gas company" to which these output settings 76 apply.

FIG. 11 is a display of the source/destination map settings 110 for the inputs and outputs 103 according to an embodiment.

The display of the source/destination map settings 110 can include a save and close button 46, and can display a migration profile name 83, a source repository 2, with a specific source repository indicated in box 113, a source control file 119, an include subfolders? indicator 121, a migrate based on destination rules? indicator 118, a destination repository 3, a map "add" button 122 connected to computer instructions of FIGS. 3A-3C, a map "view/edit" button 124, and a map "delete" button 126.

FIG. 12 is a display of an edit source/destination map according to an embodiment.

As shown in FIG. 12, the edit source destination map 130 can include a source repository 2 or destination repository 3 display.

Both displays can have a "this folder" indicator 166, and a "total folders" indicator 168.

The source repository 2 display can include an input system type 93 indicator. In this example the source system type indicator is "file share".

The source repository 2 display can include a source environment 107 indicator, which in this example is titled "local file share".

The source repository 2 display can include a source folder path 136 and a source browse button 138. This edit source/destination map includes an include data subfolders indicator 121, and a source reference file path 177, as well as a file path browse button 140.

FIG. 13 is a display of an edit source/destination map 130 showing a destination repository 3 display which shows the company name, which is the profile name of the profile migration.

As shown in FIG. 13, the edit source destination map 130 can include a source repository 2 or destination repository 3 display.

The destination repository 3 display can include the "this folder" indicator 166, and the "total folders" indicator 168.

The destination repository 3 display can include an output system type 78 which in this example is "File Share".

The destination repository 3 display can include a destination root path default 154, a destination folder name 156, and a full destination path 180.

FIG. 13 also shows the edit source/destination map 130 having a destination root map "browse" button 164, an "insert reference" button 160, and a destination rules button 179.

Also shown is the embodiment of a radio button which acts as an indicator to migrate content based on destination rules for this source indicator. This button is referred to as the "migrate content based on destination rules for this source location?" indicator 162.

The system for migrating electronic files from a plurality of sources to a plurality of destinations can be used in a method that involves: forming a dynamic rules generation library, creating a migration profile for the source material, creating a migration management console with at least one migration profile entry, forming an editable file inventory using metadata of the source material, applying exclusion rules of the migration profile to the editable file inventory, applying classification rules of the migration profile to the editable file inventory, applying input/output settings to the editable file inventory, simulating migration of metadata from a source repository to a destination repository using the configuration settings, verifying that the migration of the file inventory occurred with fewer than a preset quantity of client approved errors and if the errors were greater than the preset quantity of client approved errors, revising the migration profile changing the configuration settings, and migrating the source material from the source repository to the destination repository after verification has occurred.

While these embodiments have been described with emphasis on the embodiments, it should be understood that within the scope of the appended claims, the embodiments might be practiced other than as specifically described herein.

What is claimed is:

1. An electronic file migration system for migrating source material comprising metadata and electronic file content from a source repository to a destination repository comprising:
- an administrative processor with an administrative data storage connected to a network for communication with a client device, wherein the client device has a client device processor and a client device data storage and the client device and the administrative processor are both connected to the network;
- a dynamic rules generation library in the administrative data storage, wherein the dynamic rules generation library comprises:
  - editable classification rules;
  - editable exclusion rules;
  - output settings for the source material; and
  - input settings for the source material;
- computer instructions configuring a processor to generate a source/destination map with a destination root path default and a full migration source to destination path based on the metadata, editable classification rules, editable exclusion rules, input settings, output settings, the source repository, and the destination repository;
- computer instructions configuring the processor to extract the metadata from the source material in the source repository and form an editable file inventory;
- computer instructions configuring the processor to create a migration profile using the editable classification rules, the editable exclusion rules, the output settings for the source material, the input settings for the source material of the dynamic rules generation library, and the extracted metadata, wherein the migration profile with a plurality of file inventory entries comprises:
  - a profile name; and
  - configuration settings;
- computer instructions configuring the processor to apply the editable exclusion rules and the editable classification rules to the plurality of file inventory entries, forming an editable preview of the plurality of file inventory entries;
- computer instructions configuring the processor to perform a simulation using only the metadata of the plurality of file inventory entries of the editable preview, wherein the computer instructions comprise:
  - computer instructions configuring the processor to copy the metadata of the source material, store the copied metadata in the administrative data storage using an editable migration profile;
  - computer instructions configuring the processor to create a visualization for the destination repository based on the simulation showing the metadata using the configuration settings, wherein the visualization for the destination repository comprises a display screen presenting a result of the simulation to a user, and further wherein the result of the simulation includes the input settings for the source material, the output settings for the source material, the editable classification rules, and the editable exclusion rules;
  - computer instructions configuring the processor to initiate an editable file inventory analysis using the metadata;
  - computer instructions configuring the processor to obtain user feedback concerning the metadata and modify the editable file inventory analysis;
  - computer instructions configuring the processor to update the metadata using the modified editable file inventory analysis, wherein the update comprises modifying the metadata based upon user feedback; and
  - computer instructions configuring the processor to verify that the simulated migration of the metadata of the plurality of file inventory entries was completed from the source repository to the destination repository using preset file migration objectives;
- computer instructions configuring the processor to initiate an actual migration of the source material using the migration profile with the plurality of file inventory entries and based on the a defined status of a progress log that provides a last sequence status of activities performed during migration simulation; and
- computer instructions configuring the processor to create a migration management console in a client device with at least one migration profile entry showing the metadata of the plurality of file inventory entries, wherein the migration management console provides: a migration profile name, a description, and configuration settings; wherein the migration management console further comprises a migration management display comprising:
  - a form inventory files button connected to computer instructions for the administrative processor to form inventory files;
  - an export button connected to computer instructions for the administrative processor to export files;
  - an apply settings button connected to computer instructions for the administrative processor to apply settings;
  - an import button connected to computer instructions for the administrative processor to import files;
  - a simulate button connected to computer instructions configuring the processor to perform the simulation using only the metadata of the plurality of file inventory entries of the editable preview;
  - a run button connected to computer instructions for the administrative processor to run a migration;
  - an audit log button connected to computer instructions for the administrative processor to display audit logs, wherein the audit logs comprise information relating to changes made by the user to the migration profile;
  - an analysis reports button connected to computer instructions for the administrative processor to display reports;
  - a save progress log button connected to computer instructions for the administrative processor to save progress logs;
  - a progress log button connected to computer instructions for the administrative processor to display progress log; and
  - a save and close button connected to computer instructions for the administrative processor to save and close the migration management console.

2. The system of claim 1, further comprising computer instructions in the administrative data storage for instructing the processor to act, wherein the computer instructions consist of a member of the group:
- computer instructions linked to a migration profile save progress log button configuring the processor to extract information from the progress log into a separate file form;
- computer instructions linked to a migration profile save and close button configuring the processor to save and close the migration profile at any point during use;

computer instructions linked to a migration management console close button configuring the processor to save and close the migration management console at any point during use; and combinations thereof.

3. The system of claim 1, wherein the editable exclusion rules include a plurality of exclusion rule entries, and each exclusion rule entry further comprises:
- an exclusion comparison rule;
- an exclusion operation rule;
- an exclusion rule value;
- an exclusion value title;
- an exclusion rule description;
- an exclusion rule delete button connected to computer instructions configuring the processor to delete an exclusion rule entry;
- an exclusion rule edit/add button connected to computer instructions configuring the processor to edit or add to an exclusion rule entry; and
- an exclusion rule save and close button connected to computer instructions configuring the processor to save and close editable exclusion rules at any time during use.

4. The system of claim 1, wherein the editable classification rules further comprise a classification rule entry, wherein each classification rule entry comprises:
- a classification comparison rule;
- a classification operation rule;
- a classification rule value;
- a classification title;
- a classification rule description;
- a classification rule delete button connected to computer instructions configuring the processor to delete a classification rule entry;
- an editable classification rule edit/add button connected to computer instructions configuring the processor to edit or add an editable classification rule entry which is a member of the group consisting of:
  - the classification comparison rule;
  - the classification operation rule;
  - the classification rule value;
  - the classification title;
  - the classification rule description; and
  - combinations thereof;
- a save and close button connected to computer instructions configuring the processor to save and close the editable classification rules; and
- an edit/view classification list button connected to computer instructions configuring the processor to edit/view a classification list.

5. The system of claim 4, further comprising computer instructions in the administrative data storage configuring the processor to form an edit and view classification list item display on the client device wherein the edit and view classification list item display presents:
- a classification title;
- a classification rule description for the displayed classification title; and
- a classification metadata display with at least one metadata rule entry, wherein the classification metadata display presents:
  - a metadata name;
  - a metadata type;
  - a format;
  - a metadata value;
  - an insert reference button linked to computer instructions in the administrative data storage configuring the processor for selecting and inserting a reference into the metadata value, wherein selecting and inserting the reference into the metadata value comprises storing a file attribute as a portion of the at least one metadata rule entry; and
  - a classification metadata delete button linked to computer instructions in the administrative data storage configuring the processor to delete at least one metadata rule entry.

6. The system of claim 1, wherein the configuration settings include: computer instructions in the administrative data storage configuring the processor to form an inputs/outputs button for presenting an inputs and outputs display having a profile name and with input settings which comprise:
- an input system type;
- an input data source environment; and
- an input data source environment root path.

7. The system of claim 1, wherein the configuration settings include: computer instructions in the administrative data storage configuring the processor to form an inputs/outputs button operable to cause the processor to display an inputs and outputs display having a profile name and with output settings which comprise:
- an output system type;
- an output system environment; and
- an output system data destination root path.

8. The system of claim 1, wherein the configuration settings include: computer instructions in the administrative data storage configuring the processor to form an inputs/outputs button operable to cause the processor to display an inputs and outputs display having a profile name and with source/destination map settings having a plurality of map rule entries, and wherein each map rule entry comprises:
- the source repository;
- the destination repository;
- a migrate based on destination rules indicator;
- a source control file;
- an include data subfolders indicator;
- a map add button linked to computer instructions in the administrative data storage configuring the processor to add source/destination map rule entries;
- a map view/edit button linked to computer instructions in the administrative data storage configuring the processor to view/edit source/destination map rule entries; and
- a map delete button linked to computer instructions in the administrative data storage configuring the processor to delete source/destination map rule entries.

9. The system of claim 8, comprising an edit source/destination map display formed from computer instructions in the administrative data storage configuring the processor to provide:
- a "this folder" indicator for depicting a number of a containers currently being currently viewed; and
- a "total folders" indicator for showing a total number of containers in the repository.

10. The system of claim 9, wherein the edit source/destination map source repository view comprises:
- a source repository indicator;
- a destination repository indicator;
- an input system type;
- a source environment;
- a source folder path;
- a source browse button linked to computer instructions configuring the processor to browse the source folder paths;
- an include data subfolders indicator;

a source reference file path linked to computer instructions configuring the processor to identify references to be inserted into the source material prior to migration; and a file path browse button linked to computer instructions in the administrative data storage configuring the processor to browse the source reference file paths.

11. The system of claim 9, wherein the edit source/destination map destination repository view comprises:
a source repository indicator;
a destination repository indicator;
an output system type;
a destination root path default;
a destination folder name;
a source/destination root map browse button connected to computer instructions configuring the processor to display a screen allowing the user to browse root maps in the administrative data storage between a source repository and a destination repository;
a source/destination insert reference button connected to computer instructions configuring the processor to display the screen allowing the user to browse references that have been inserted into root maps;
a destination rules button connected to computer instructions to apply additional destination rules to file inventory;
a migrate content based on destination rules for this source indicator; and
a full destination path.

12. The system of claim 1, wherein the computer instructions that present the migration management console enable the migration management console to present a plurality of migration profile entries, wherein each migration profile entry comprises:
a profile name;
a creator;
a creation date;
a profile description;
an input system type;
an output system type;
a migration console delete button connected to computer instructions configuring the processor to delete migration profile entries in the migration management console;
a migration console view/edit profile button to connected to computer instructions configuring the processor to view migration profile entry, edit the migration profile entry, or combinations thereof; and
a create new profile button connected to computer instructions configuring the processor to create a new migration profile.

13. The system of claim 1, wherein the computer instructions of the migration profile further comprise a member of the group consisting of:
computer instructions configuring the processor to verify that the simulated migration of the file inventory was completed from the source repository to the destination repository with fewer than a preset number of client allowable errors;
computer instructions configuring the processor to revise the migration profile, changing configuration settings when the simulated migration is completed with errors greater than the preset number of client allowable errors;
computer instructions configuring the processor to migrate the source material after simulation with fewer than the preset number of client allowable errors has occurred; and
combinations thereof.

14. The system of claim 1, wherein the computer instructions of the migration profile further comprise a member of the group consisting of:
an export button to activate computer instructions configuring the processor to export a file inventory; and
an import button to activate computer instructions to import a file inventory in a first format after modifications are performed on the file inventory, and combinations thereof.

15. The system of claim 1, wherein the migration profile further comprises a migration profile description.

16. The system of claim 15, wherein the configuration settings comprise:
computer instructions configuring the processor to form a create input/output settings button that activates computer instructions configuring the processor to create input/output based settings;
a create exclusion rule button that activates computer instructions configuring the processor to create exclusion rules; and
a create classification rule button that activates computer instructions configuring the processor to create classification rules.

17. The system of claim 1, wherein the migration profile includes an apply settings component consisting of:
an apply filter button to activate computer instructions configuring the processor to remove the source material excluded by the configuration settings;
an apply exclusion rules button to activate computer instructions configuring the processor to apply exclusion rules to the source material; and
an apply classification rules button to activate computer instructions configuring the processor to apply classification rules to the source material; and combinations thereof.

18. The system of claim 1, wherein the migration profile further comprises:
an audit log button to link to computer instructions configuring the processor to create a log of the user's interactions with the migration profile; and
an analysis reports button to activate computer instructions in the administrative data storage configuring the processor to provide analysis reports selected from the group consisting of:
editable file inventory of the source material;
the source material with applied exclusion rules;
the source material with applied classification rules;
an exported source material;
a migration simulation;
an actual migration; and
combinations thereof.

19. The system of claim 1, further comprising in the administrative data storage computer instructions configuring the processor to create a classification list by providing an edit and view edited classification rules displaying the classification title and classification rule description of the migration profile.

20. The system of claim 19, further comprising in the administrative data storage computer instructions to delete an entry from the classification list, computer instructions configuring the processor to add a classification list item, computer instructions configuring the processor to save and close the classification list, and computer instructions configuring the processor to provide a "this folder" indicator and a "total folders" indicator.

21. The system of claim 1, further comprising in the administrative data storage, computer instructions configuring the processor to save and close the actual migration, save and close the migration simulation, or combinations thereof, at any point of migration.

* * * * *